(12) United States Patent
Sheikh-Bahaie

(10) Patent No.: US 8,640,534 B2
(45) Date of Patent: Feb. 4, 2014

(54) MOUNTING METHOD AND DEVICE FOR TIRE PRESSURE MONITORING SENSOR

(75) Inventor: Kian Sheikh-Bahaie, Port Moody (CA)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 350 days.

(21) Appl. No.: 13/214,285

(22) Filed: Aug. 22, 2011

(65) Prior Publication Data

US 2013/0049442 A1    Feb. 28, 2013

(51) Int. Cl.
*G01M 17/02* (2006.01)
(52) U.S. Cl.
USPC .................................................. 73/146
(58) Field of Classification Search
None
See application file for complete search history.

(56) References Cited

U.S. PATENT DOCUMENTS

| | | | |
|---|---|---|---|
| 4,235,184 A * | 11/1980 | Schiavone | 116/34 R |
| 5,452,608 A | 9/1995 | Green | |
| 5,798,689 A * | 8/1998 | Huang | 340/447 |
| 6,217,683 B1 | 4/2001 | Balzer et al. | |
| 6,631,637 B2 * | 10/2003 | Losey | 73/146 |
| 6,672,150 B2 | 1/2004 | Delaporte et al. | |
| 6,805,000 B1 | 10/2004 | Sheikh-Bahaie | |
| 6,997,223 B2 | 2/2006 | Naito | |
| 7,040,155 B1 | 5/2006 | Lundell et al. | |
| 7,082,817 B1 | 8/2006 | Yu et al. | |
| 7,098,780 B2 | 8/2006 | Altaber et al. | |
| 7,187,272 B2 | 3/2007 | Katou | |
| 7,204,136 B2 | 4/2007 | Thrush et al. | |
| 7,224,269 B2 | 5/2007 | Miller et al. | |
| 7,228,731 B2 | 6/2007 | Yamagiwa et al. | |
| 7,246,518 B2 | 7/2007 | Ito et al. | |
| 7,278,306 B2 | 10/2007 | Baum | |
| 7,350,407 B2 | 4/2008 | Shimura | |
| 7,369,043 B2 | 5/2008 | McQuade | |
| 7,380,450 B2 * | 6/2008 | Durif | 73/146 |
| 7,395,701 B2 | 7/2008 | Huchard | |
| 7,404,427 B2 | 7/2008 | Hillman et al. | |
| 7,441,452 B2 * | 10/2008 | Phalak et al. | 73/146 |
| 7,487,668 B2 | 2/2009 | Aoki | |
| 7,516,653 B2 | 4/2009 | Blossfeld | |
| 7,521,902 B2 | 4/2009 | Wiegman et al. | |
| 7,570,157 B2 | 8/2009 | Miller et al. | |
| 7,587,935 B2 | 9/2009 | Kempf et al. | |
| 7,661,311 B2 | 2/2010 | Houben et al. | |
| 7,694,557 B2 | 4/2010 | Hettle et al. | |
| 7,705,717 B2 | 4/2010 | Pearce et al. | |
| 7,757,550 B2 | 7/2010 | Chuang et al. | |

OTHER PUBLICATIONS

*Smart Tire Tire Pressure Monitoring System* brochure by Bendix CVS, Operator's Manual, Copyright 2010 Bendix Commercial Vehicle Systems LLC.
*Tire Pressure Monitoring System Tire Safety System—TSS* flyer, Feb. 2005, BERU Aktiengesellschaft.

* cited by examiner

*Primary Examiner* — Lisa Caputo
*Assistant Examiner* — Jermaine Jenkins
(74) *Attorney, Agent, or Firm* — Fay Sharpe LLP

(57) ABSTRACT

A tire pressure monitor mount includes a carrier (20) adapted to temporarily suspend a tire pressure monitor (36) between the sidewalls (16) of a tire (10) prior to installation of the tire (10) on a wheel (62). Upon installation of the tire on the wheel (62), the carrier (20) is fixed in place thereby suspending the tire pressure monitor (36) between the sidewalls (6) and in spaced relation to the rim (66) where the tire pressure monitor (36) is less likely to be impacted and/or damaged by debris/chemicals within the tire (10).

21 Claims, 7 Drawing Sheets

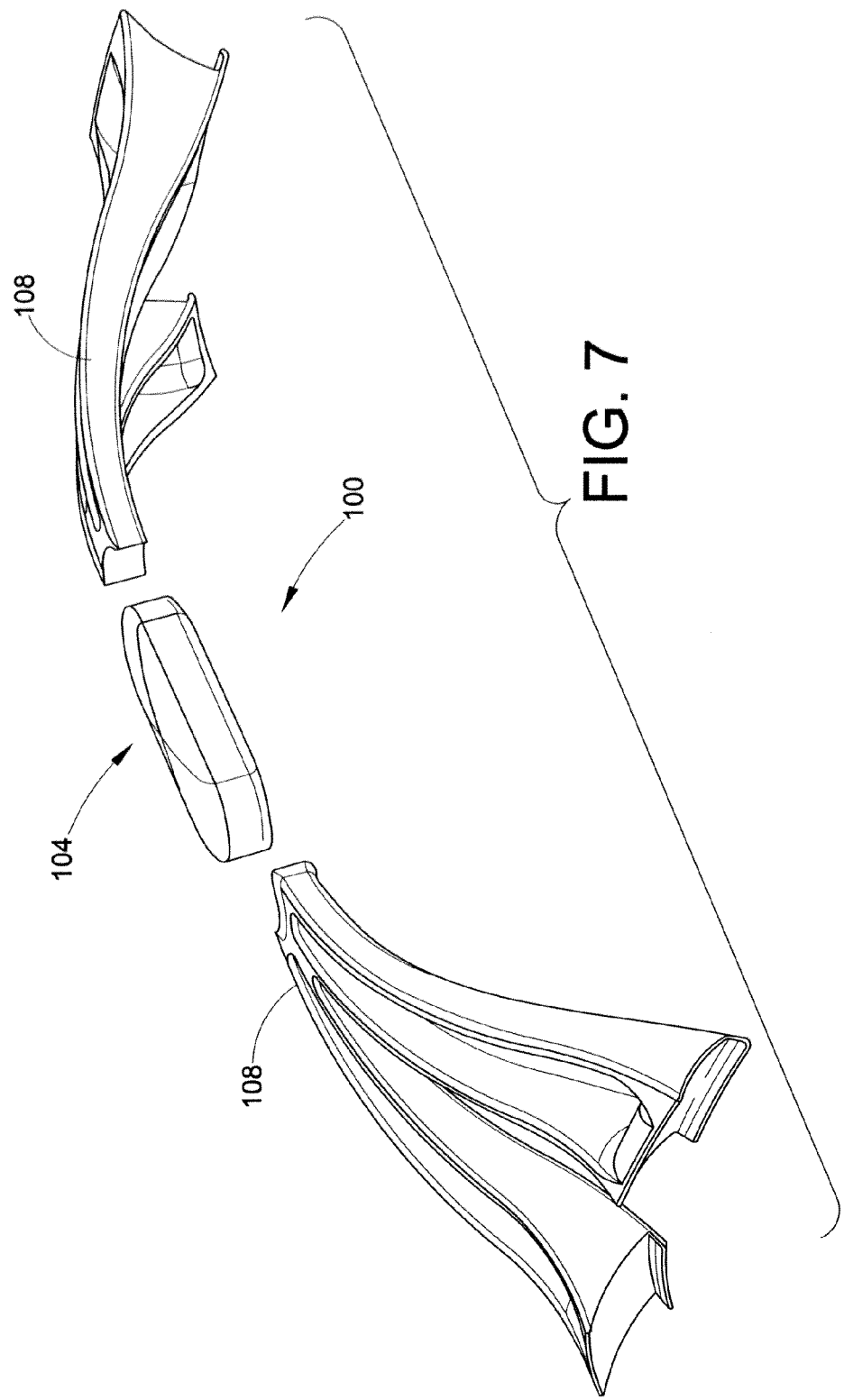

MOUNTING METHOD AND DEVICE FOR TIRE PRESSURE MONITORING SENSOR

BACKGROUND

The present application finds particular application in wheel and tire assemblies for vehicles, particularly a wheel and pneumatic tire assembly including a tire pressure monitoring sensor. However, it will be appreciated that the described technique may also find application in other wheel and tire assemblies.

In general, the air pressure in vehicle pneumatic tires should be maintained within a particular range to protect against tire damage or failure, and to promote safe and efficient operation of the vehicle. Overinflated or underinflated tires may cause tire wear, internal tire damage, increased risk of tire penetration by sharp objects, blowouts and/or reduced vehicle fuel economy. A tire pressure monitoring system (TPMS) can be used to monitor air pressure inside a pneumatic tire and to generate an alert if the tire pressure falls outside of a desirable range for the tire. A TPMS may incorporate a tire pressure sensor placed inside a tire and means for transmitting pressure information detected by the tire pressure sensor to a receiver.

A TPMS may be used for monitoring air pressure in off-the-road (OTR) pneumatic tires used on large off-road vehicles such as mining trucks, construction vehicles or the like. In mining vehicle applications (as well as others), tire performance is critical and tire failure can be both expensive, in terms of lost production, and can also be dangerous to mine personnel. Accordingly, it is particularly important that TPMS function properly to ensure proper inflation and to detect tire issues before they present an issue.

Installation of tire pressure sensors in OTR pneumatic tires presents several challenges. First, the interior of OTR (other pneumatic tires) may have liquids and/or gases, due at least in part to the presence of chemicals which are used to treat the tires to facilitate mounting and dismounting of the tires to wheels. Moreover, the very large tires of mining trucks are often stored outside prior to being put into service, and can accumulate rocks, soil and other debris that is difficult to remove and ultimately remains in the tire after mounting. A tire pressure sensor placed inside such tires can be exposed to the liquids and/or gases that can corrode the sensor components, and the debris in the tire can collide with the tire pressure sensor causing damage thereto, or dislodging it from s mount in which case the tire pressure sensor is likely to rapidly fail.

To address these challenges, various approaches have been developed for mounting the tire pressure sensor within the tire. One approach is a rim mount tire pressure monitor. Although not typically used in mining applications, such approach aims to secure the tire pressure monitor to the wheel itself, or to a valve stem that is assembled in the wheel. While this approach is convenient in that the rim or wheel provides a stable foundation on which to mount the tire pressure monitor, rim mounts are susceptible to damage during installation of the tire as the tire passes over the rim and, due to the close proximity of the sensor to the metal structure of the rim, can cause interference with the transmitter thus decreasing performance.

Another approach is to secure the tire pressure monitor to the interior of the tire, either to the tire back or the sidewall. In mining applications, the tire back is not an attractive option due to the fluid and or debris that is typically found in the tire after installation. A monitor mounted to the tire back would constantly be in contact with the fluid and/or debris during rotation of the tire. Accordingly, most mining application approaches have focused on mounting the tire pressure monitor to the sidewall at a position such that the monitor is between the tire back and the rim when installed.

One sidewall mount approach includes cleaning the interior surface of the tire with a solvent, and then attaching the tire pressure monitor or its carriage to the tire with an adhesive. This approach requires a number of steps to be completed properly to ensure adequate performance. First, the tire surface must be cleaned to ensure the adhesive forms a solid bond. Second, the location of the tire pressure monitor needs to be determined. If the tire pressure monitor is mounted too high on the sidewall it will be subject to constant splashing and/or submersion in the fluid in the tire. If mounted too low, the tire pressure monitor could be damaged during installation or when the tire is deformed under load. Third, the adhesive must be properly applied and allowed to cure before being placed into service. Depending on environmental conditions, selecting the proper adhesive is also important. The resulting mount is generally permanent and, thus, repair and/or replacement of the tire pressure monitor or its carriage is generally not possible after installation.

A similar sidewall mount approach utilizes a hook-and-loop fastener to secure the tire pressure monitor to the tire. While this approach allows removal and replacement of the tire pressure monitor, it still requires the aforementioned steps to be carried out properly to ensure adequate performance.

The present innovation provides a new and improved tire pressure monitor mount, which overcomes the above-referenced problems and others.

SUMMARY

A tire pressure monitor mount includes a carrier adapted to temporarily suspend a tire pressure monitor between the sidewalls of a tire prior to installation of the tire on a wheel. Upon installation of the tire on the wheel, the carrier is fixed in place thereby suspending the tire pressure monitor between the sidewalls and in spaced relation to the rim where the tire pressure monitor is less likely to be impacted and/or damaged by debris/chemicals within the tire.

In accordance with an aspect, a wheel and tire assembly comprises a tubular wheel having a central axis of rotation, a circumferential rim and first and second axially spaced apart circumferential rim flanges extending radially outwardly from the rim, a tire having a circumferential driving surface extending between opposing sidewall portions, the tire supported on the wheel between the first and second rim flanges, and a tire pressure monitor carrier interposed between the wheel and tire for supporting a tire pressure monitor, the carrier having a cradle portion extending between the sidewall portions of the tire, and first and second retaining members at opposite ends of the cradle portion for securing the carrier to the tire between the sidewalls prior to installation of the tire on the wheel and for locking the carrier in place between the tire and rim after installation of the tire on the wheel.

In one embodiment, each retaining member can have an axial end face for abutting an interior surface of a respective sidewall, and an axially extending lip interposed between the tire and the rim, whereby the axial end faces of the first and second retaining members secure the carrier to the tire prior to installation of the tire on the wheel, and wherein the axially extending lips of the first and second retaining members are compressed between the tire and rim to thereby lock the carrier in place after assembly of the tire on the wheel. The carrier can further include a tire pressure monitor mount portion located centrally between the first and second retaining members for supporting a tire pressure monitor. The mount portion can be spaced radially outwardly from the first and second retaining members in spaced apart relation to the rim. The mount portion can be aligned with a radial midpoint of the tire sidewalls. The carrier can further include a pair of axially extending legs extending from opposite sides of the cradle portion, each leg having a retaining member at a distal end thereof. The carrier can have an axial dimension that is greater than the axial distance between the sidewalls of the tire prior to installation of the tire on the wheel, whereby the carrier, when interposed between the sidewalls of the wheel, urges the sidewalls apart from each other. The carrier can be made of a composite material and/or at least a portion of the engaging members can be metal. The assembly can further include a tire pressure monitor supported by the carrier.

In accordance with another aspect, a tire pressure monitor carrier for supporting a monitor inside an associated wheel and tire assembly comprises a cradle portion for supporting a tire pressure monitor, and first and second retaining members operative connected to the cradle portion for securing the carrier between sidewalls of an associated tire, wherein each retaining member includes a lip adapted to be compressively engaged between the associated tire and an associated wheel to which the associated tire is mounted, the lips of the retaining member operative to secure the carrier in position inside the associate tire after the tire is mounted to the associated wheel.

The carrier can have a longitudinal axis and each retaining member can have an axial end face for abutting an interior surface of a respective sidewall of the associated tire, with each lip of the retaining members extending axially outwardly from the respective axial end faces, whereby the axial end faces of the first and second retaining members secure the carrier to the associated tire prior to installation of the associated tire on the associated wheel, and wherein the axially extending lips of the first and second retaining members are configured to be compressed between the associated tire and the associate wheel to thereby lock the carrier in place after assembly of the associated tire on the associated wheel.

The cradle portion can include a tire pressure monitor mount portion for supporting an associated tire pressure monitor or the tire pressure monitor sensor can be integrated with/within the cradle portion. The carrier can further include a pair of outwardly extending legs extending from opposite sides of the cradle portion, each leg having a retaining member at a distal end thereof. The legs can be curved such that the cradle portion of the carrier is spaced apart from a rim of the associated wheel when the carrier is installed in an associated wheel and tire assembly. The carrier can be made of a composite material and/or at least a portion of the engaging members can be metal.

In accordance with another aspect, a method of mounting a tire pressure monitor to a wheel and tire assembly comprises positioning a tire pressure monitor carrier having a cradle portion and retaining members extending from opposing sides of the cradle portion between respective sidewalls of an unmounted tire, temporarily securing the tire pressure monitor to the sidewalls of the tire by engaging the retaining members with the side walls of the tire, mounting the tire on a wheel while the carrier is temporarily secured to the tire; and fixing the tire pressure monitor between the tire and the wheel. The fixing step can include compressing a portion of at least one retaining member between the tire and the wheel. The compressing a portion of at least one retaining member can be a result of installing the tire on the wheel.

One advantage of the disclosure is that a tire pressure monitor can be installed in the field without the use of adhesives. Another advantage is that guesswork regarding the positioning of the tire pressure monitor within the tire is reduced or eliminated. Another advantage is that no special tools are required for installation. Another advantage is that vehicle safety may be improved.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

FIG. 7 is a perspective view of an exemplary modular tire pressure monitor carrier having legs that are securable to a central body portion.

DETAILED DESCRIPTION

Figure 1:
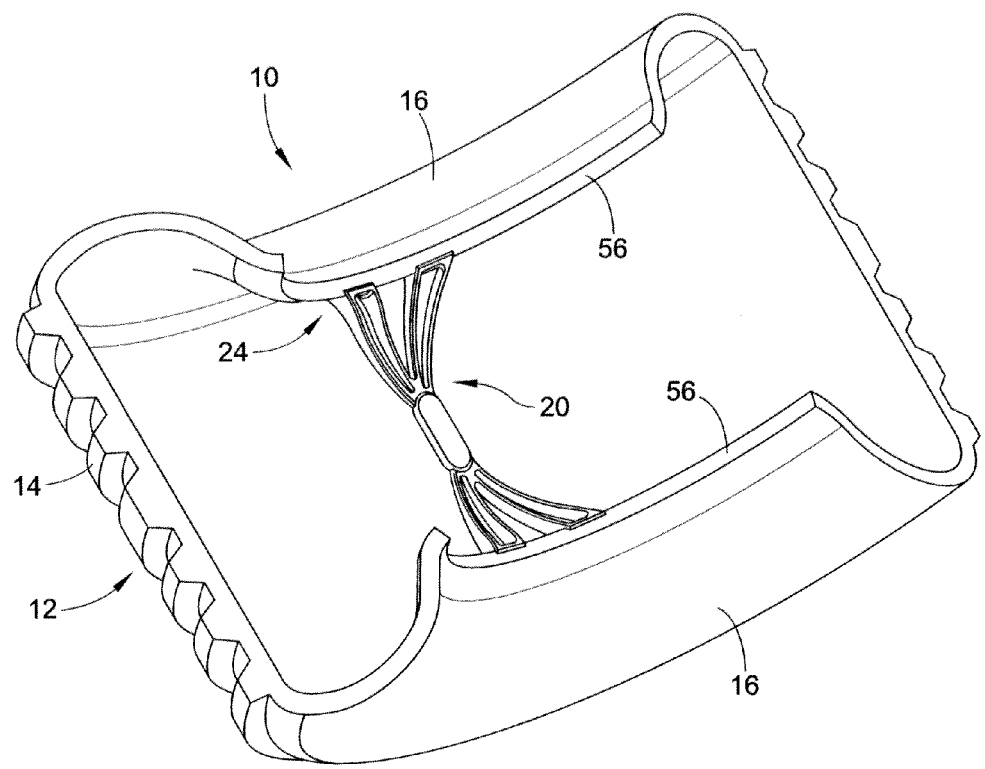
FIG. 1 is a cutaway perspective view of a portion of a tire including an exemplary tire pressure monitor carrier in accordance with the disclosure.
Figure 2:
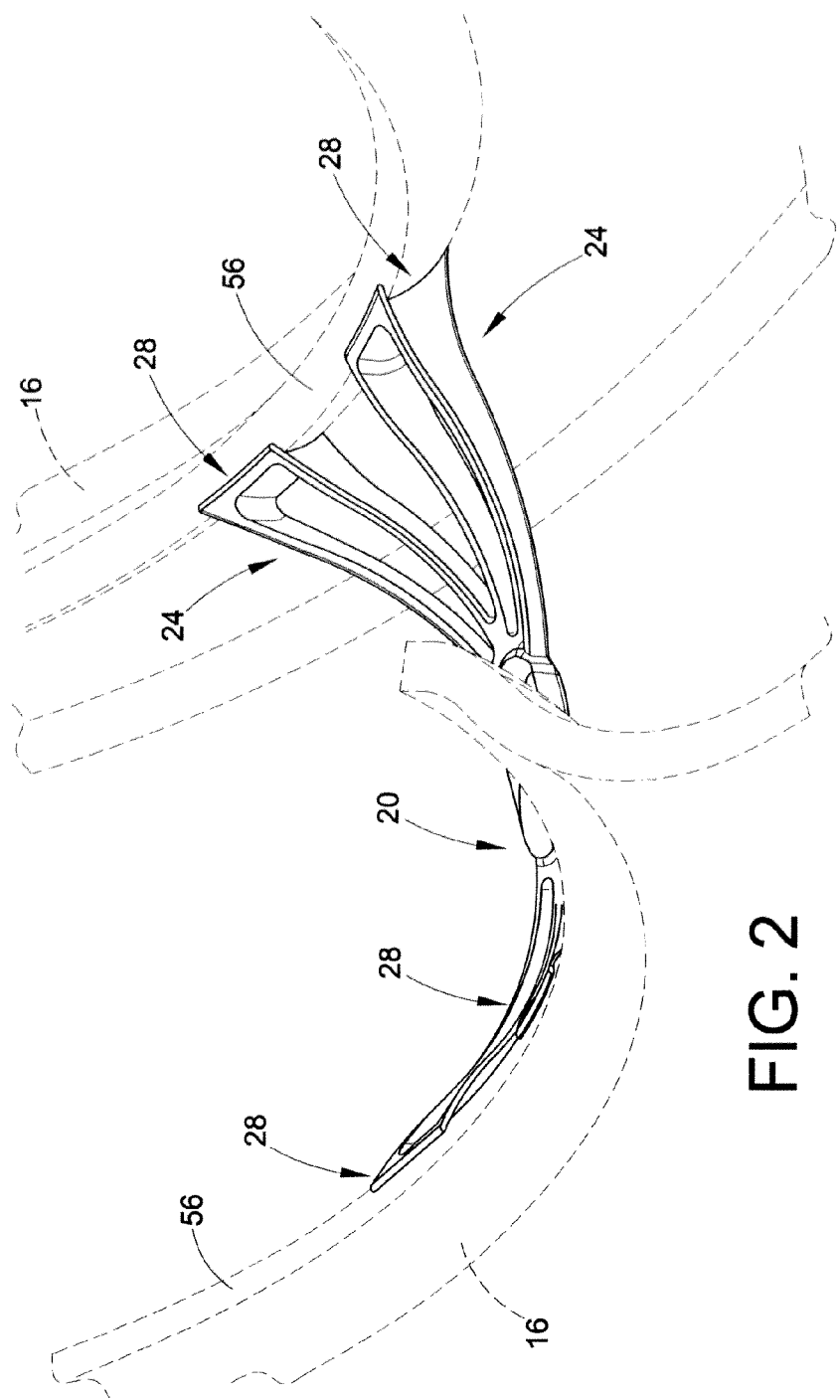
FIG. 2 is an enlarged view of a portion the exemplary tire pressure monitor and tire of FIG. 1.

FIGS. 1 and 2 illustrate a cutaway portion of a tire 10 having a driving surface 12, including tread elements 14, and a pair of side walls 16. A tire pressure monitor carrier 20 in accordance with the disclosure is mounted to the tire 10. The tire pressure monitor carrier 20 can be mounted to virtually any tire, and thus the specific details of the tire construction are not germane to this disclosure and have been omitted for the sake of brevity.

The tire pressure monitor carrier (TPMC) 20 is supported between the sidewalls 16 of the tire 10. To this end, the TPMC 20 has retaining members 24 including feet 28 that engage each sidewall 16. The feet 28 are configured to temporarily secure the TPMC 20 to the tire 10 during installation of the tire 10 on a wheel, and to further secure/fix the TPMC 20 in place after the tire 10 is secured to a wheel, as will be described in more detail below.

Figure 3:
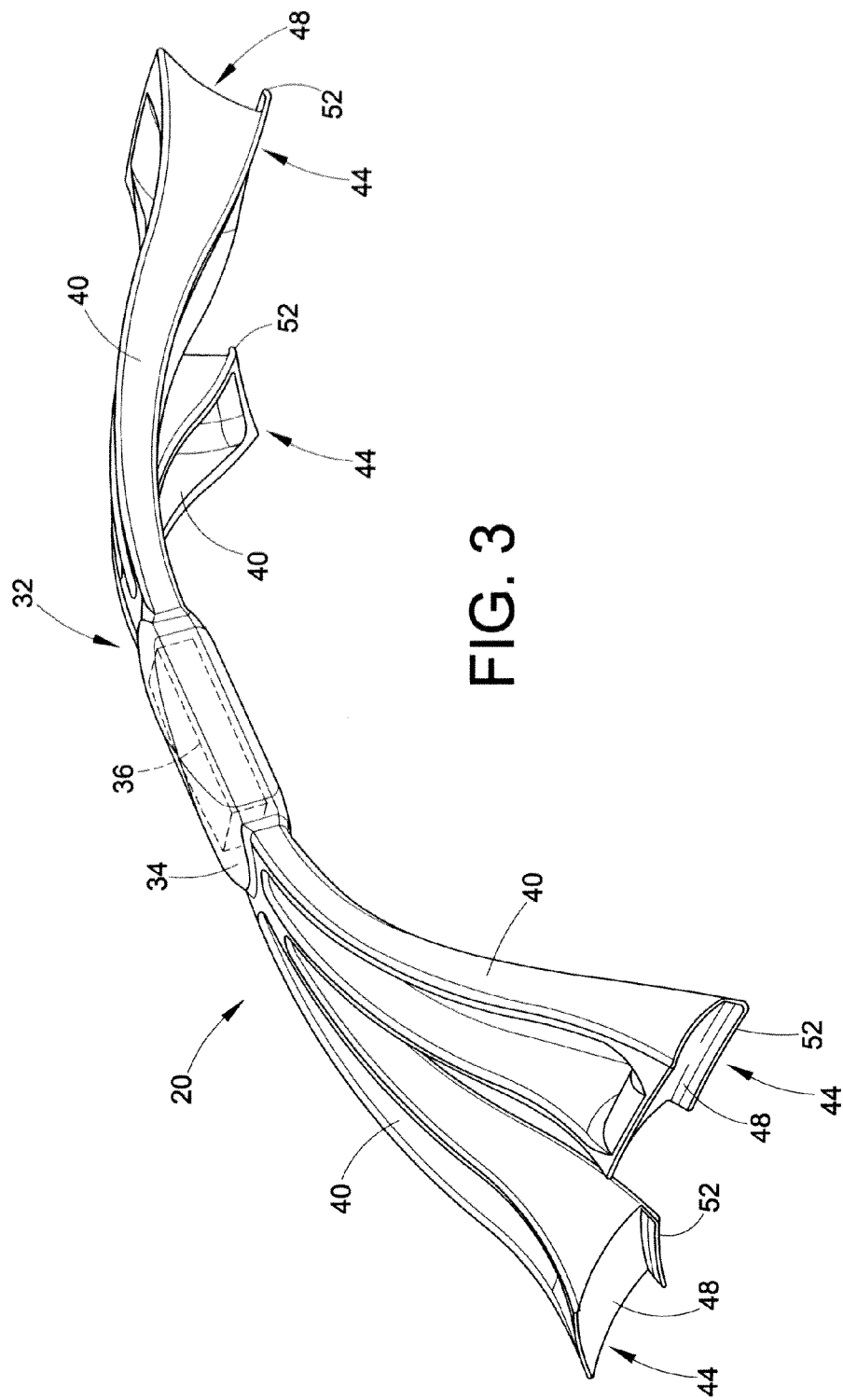
FIG. 3 is a perspective view of the exemplary ire pressure monitor carrier of FIGS. 1 and 2.
Figure 4:
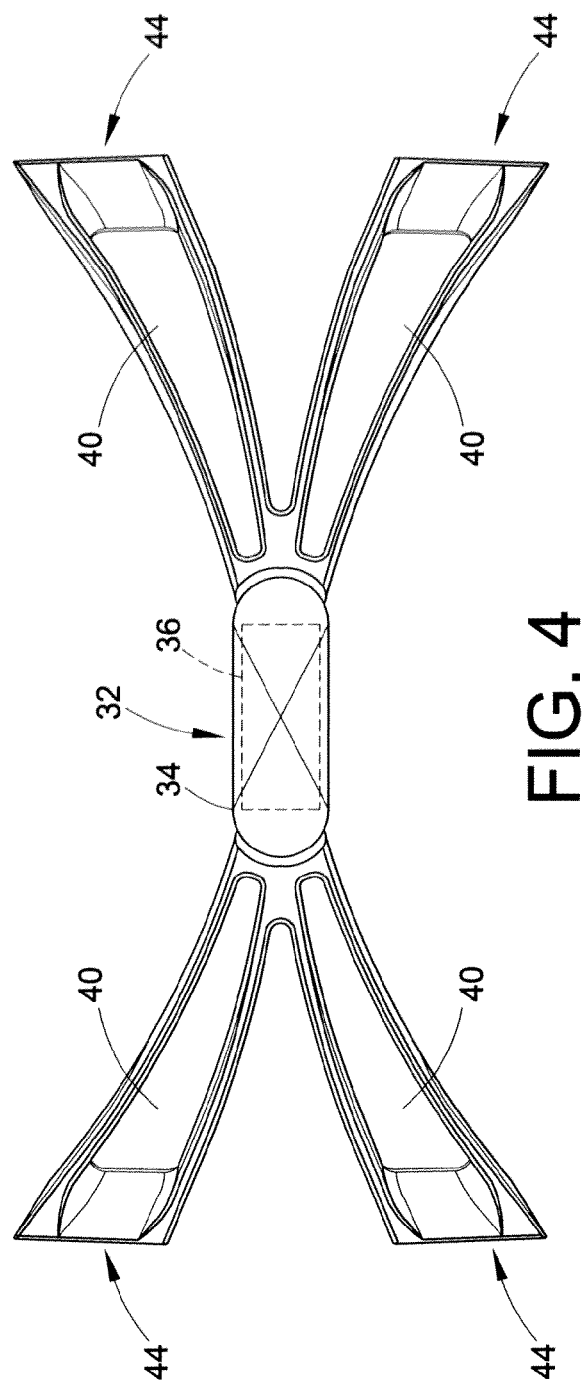
FIG. 4 is plan view of the tire pressure monitor carrier of FIG. 3.

With further reference to FIGS. 3 and 4, the details of TPMC 20 will be described. The TPMC 20 includes a cradle portion 32 having a housing 34 containing a tire pressure monitor 36. In the illustrated embodiment, the tire pressure monitor 36 is sealed or otherwise contained within the housing 34 of the TPMC 20. As will be appreciated, a typical tire pressure monitor 36 can include a power source, a sensor and a transmitter for communicating pressure readings to a remote computer or other device. Other components, such as switching mechanisms for activating the unit are also common and could also be contained within the housing 34. It will be appreciated that the tire pressure monitor 36 need not be sealed within the housing 34 and instead can be merely supported on or in the housing 34, as desired.

Extending from the housing 34 are curved legs 40. At the distal end of each leg 40 is a retaining member in the form of a foot 44 for securing the carrier to the tire 10 between the sidewalls 16 prior to installation of the tire 10 on a wheel, and also for locking the TPMC 20 in place between the tire 10 and a rim of the wheel after installation of the tire 10 on the wheel. In the exemplary embodiment there are four legs 40, but any number of legs can be used as desired. Also, the legs 40 are formed integrally with the housing 34 as a one-piece structure, but could be separate components secured to the housing 34 of the cradle portion 32. The legs 40 also have an aerodynamic shape to reduce drag against liquid impact during rotation of the tire, reducing the impact force on the unit.

Each foot 44 has an axial end face 48 for abutting an interior surface of a respective sidewall 16, and an axially extending lip 52 configured to be interposed between the tire 10 and the rim of a wheel. The axial end faces 48 engage the inner surfaces of the sidewalls 16, as shown in FIGS. 1 and 2, and thereby secure the TPMC 20 to the tire 20 prior to installation of the tire 20 on a wheel. To this end, the TPMC 20 can have an axial dimension that is greater than the axial distance between the sidewalls 16 of the tire 10 prior to installation of the tire 10 on a wheel. Thus, the TPMC 20 tends to urge the sidewalls 16 apart from each other. In turn, the reactive compressive force applied to the feet 44 by the sidewalls 16 temporarily secures the TPMC 20 in place on the tire 10. In the alternative, or in addition, the feet 44 can be contoured so as to have a shape corresponding to a portion of the sidewall such that the feet 44 engage the sidewall in a friction fit manner to secure the TPMC 20 between the sidewalls 16.

As will be appreciated with reference to FIGS. 1 and 2, when the TPCM 20 is secured between the sidewalls 16, the axially extending lips 52 of the feet 44 extend along and engage a radially inner circumferential surface 56 of the tire 10. In the illustrated exemplary embodiment, the lips 52 extend only along this radially inner surface 56 but it will be appreciated that other configuration are possible. For example, one or more of the lips 52 could extend around to an axially outer surface of a sidewall such that the foot would engage the sidewall 16 on both its interior and exterior surfaces.

Figure 5:
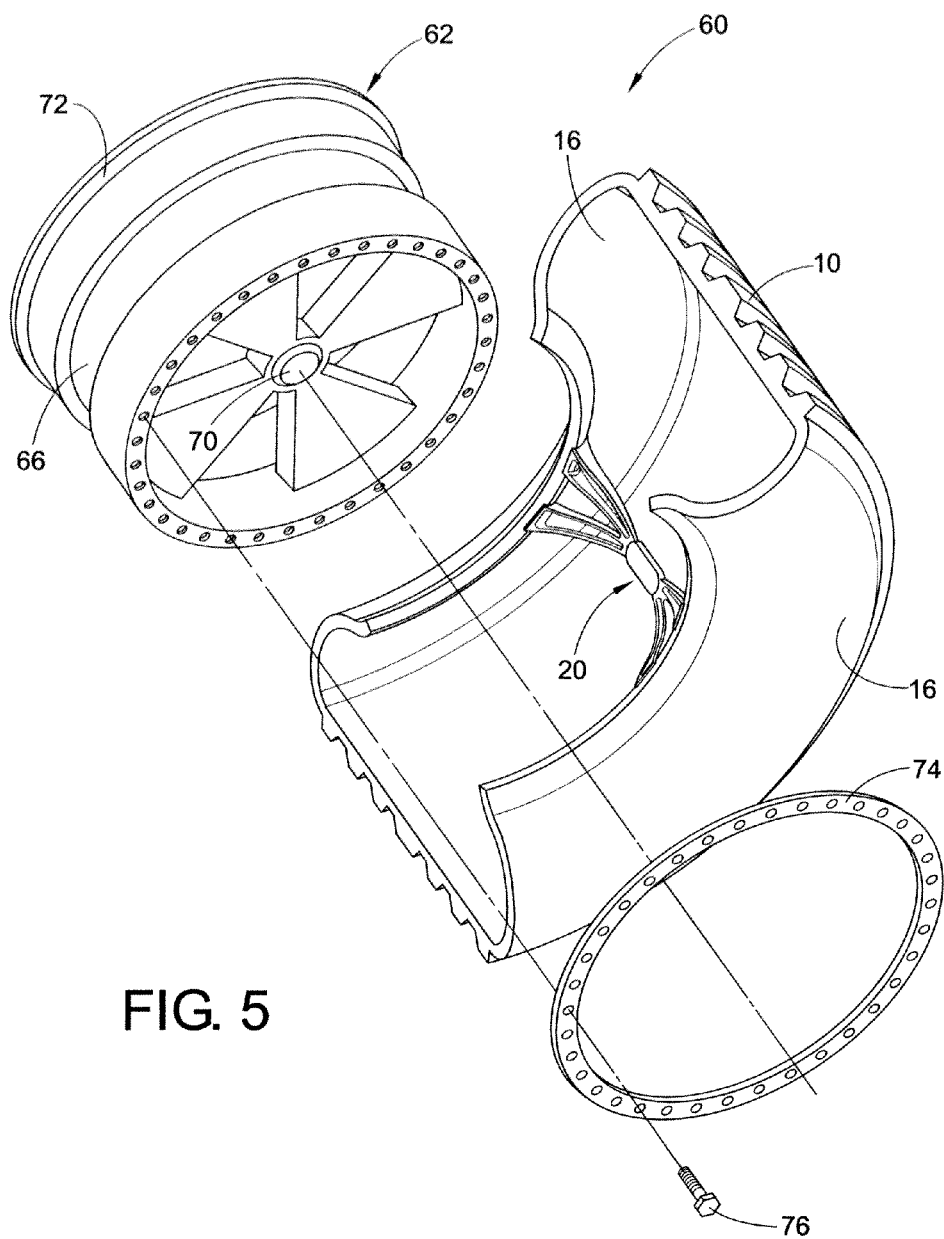
FIG. 5 is an exploded view of an exemplary wheel and tire assembly including the tire pressure monitor carrier.
Figure 6:
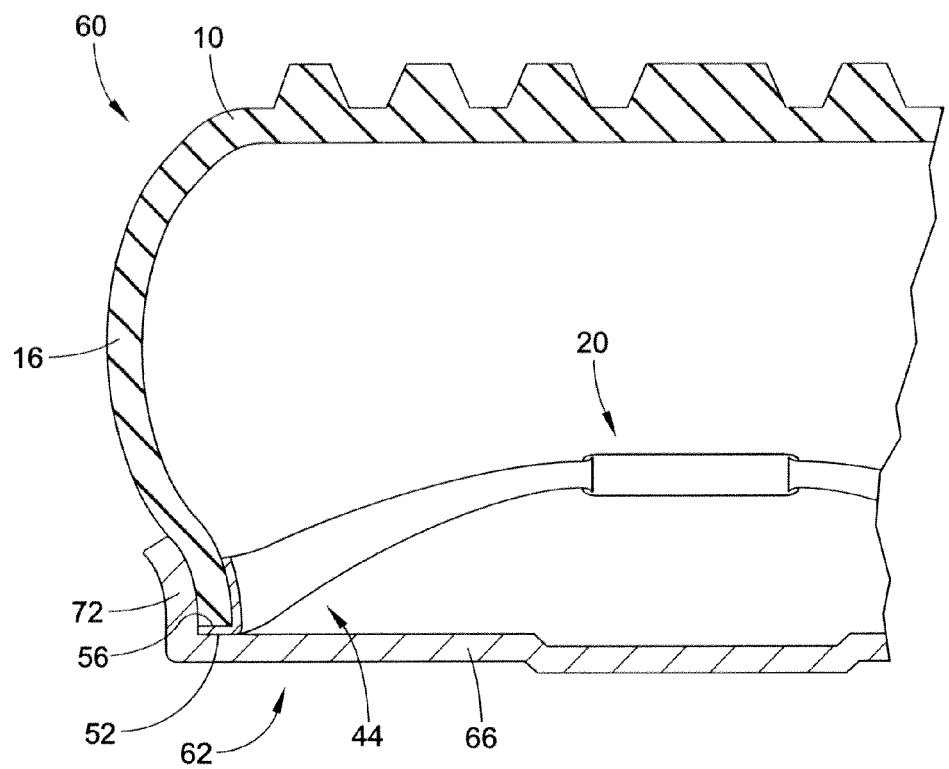
FIG. 6 is a partial cross-sectional view of the exemplary wheel and tire assembly of FIG. 5 taken through a diameter of the assembly.

Turning now to FIGS. 5 and 6, the tire 10 and TPMC 20 are illustrated as part of a wheel and tire assembly 60. The tire 10 is mounted to a wheel 62 in a conventional manner, and TPMC 20 is secured in place between the tire 10 and wheel 62. The exemplary wheel 62 is of a style often employed on large machinery, such as mining trucks, and includes a generally tubular structure having a central axis of rotation. A circumferential rim portion 66 surrounds a central web structure 70. The rim portion 66 includes a fixed rim flange 72. A second rim flange 74 is removably secured to the rim portion 66 by suitable fasteners, such as bolts 76. The fixed flange 72 and removable flange 74 are axially spaced and engage opposite sidewalls 16 of the tire 10.

With reference to FIG. 6, the manner in which the TPMC 20 is secured between the tire 10 and wheel 62 is shown. In particular, it can be seen that lip 52 of the foot 44 is trapped between the tire 10 and wheel 62, more specifically between the radially inner surface 56 of the tire sidewall 16 and the rim portion 66 of the wheel 62. Although not shown in FIG. 6, the opposite side of the TPMC 20 is secured in a similar fashion. In the illustrated assembly, the axially outer surface of tire sidewall 16 seals against the rim flange 72. The TPMC 20 does not extend to the axially outer surface of the tire sidewall 16, and thus does not impact the sealing surfaces. In general, the TPMC 20 should be configured to avoid interruption of the tire/wheel seal. Of course, other arrangements are also possible.

As will be appreciated, once installed in the wheel and tire assembly 60, the portion of the TPMC 20 including the tire pressure monitor 36 is spaced radially outwardly from the radially outer surface of the rim 66. The spacing between the tire pressure monitor 36 and the rim 66 can be determined by the shape of the curved legs 40. For example, the legs 40 can be curved or otherwise shaped to locate the tire pressure monitor 36 at a particular location within the wheel/tire assembly. In some applications it may be desirable to locate the tire pressure monitor closer to the wheel rim than the tire driving surface. In such case, the legs 40 of the TPMC 20 can have a generally flatter shape. In applications where more spacing between the wheel rim and the tire pressure sensor is desired, the legs 40 could have a more arcuate shape.

The TPMC 20 of FIGS. 1-6 is illustrated as a unitary one-piece structure that can be formed by a molding process, for example. In FIG. 7, a modular TPMC 100 is illustrated having a cradle portion 104 and leg portions 108 that are attachable to the cradle portion. A wide variety of leg portion shapes and lengths can be provided such that, by selecting and connecting particular leg portions to the cradle portion 104, the overall dimensions of the TPMC 100 are adjustable. For example, leg portions having different axial lengths, curvature, size, foot portions etc. could be provided allowing an installer to select the appropriate leg portions for a given application. Moreover, the modular design can facilitate reusing of components of the TPMC 100. For example, if a sensor is defective and needs replacing, the leg portions 108 could be reused with a new cradle portion 104 including a new sensor.

The TPMC 20 and 100 described above can be made of any suitable material, including plastics and metal. In some applications, it can be advantageous to utilize a non-metallic material to avoid any transmission interference that could result from a metallic structure surrounding the sensor/transmitter. In some applications, it can also be advantageous to use a combination of materials, for example, a composite carrier body with metallic feet and/or metallic lips.

The installation procedure for installing a TPMC in accordance with this disclosure in a wheel and tire assembly generally involves simply placing the carrier between respective sidewalls of a tire and then installing the tire on the wheel in a conventional fashion. Tire handlers are often employed for removing and installing tires on the wheels of a mining truck. Some tire handlers are essentially modified forklift attachments that have movable arms capable of compressively engaging a tire on opposite sides of its driving surface in order to grasp and move the tire. The tire handler picks up a tire in this manner and forces the tire onto the wheel while it the wheel remains mounted on the vehicle. A rim flange is then commonly installed on the wheel thereby locking the tire in place. The tire can then be inflated and placed into service.

During installation of a tire on a wheel in the manner described above, the tire is typically slightly deformed by the arms of the tire handler and takes on a slightly oblong shape (as opposed to round) as it deforms. As the tire is placed on a cylindrical wheel, the oblong shape of the tire creates small gaps between the tire and the wheel at the oblong ends of the otherwise round tire opening. It is preferable to place the carrier in a location on the tire that will correspond to one of these gaps such that the carrier is less likely to contact the wheel during installation until after the tire is fully seated thereon by the tire handler. Although the carrier need not be placed in such position, doing so can minimize the chances of the carrier being dislodged during installation.

Once the tire (and carrier) is placed in position on the wheel, the installation of the tire can otherwise proceed as normal, with the carrier designed to he locked in placed automatically when the tire installation is complete and the tire is inflated. Once pressurized, the tire creates the final load that locks the carrier in place. Accordingly, the present disclosure provides a TPMC that is very simple to install and eliminates many of the sources of error associated with prior art mounting approaches. The improved design eliminates the need to prepare a tire sidewall for adhesive, accurately position the tire pressure monitor on the sidewall, and properly apply and cure the adhesive to secure the sensor in place.

In addition, a TPMC in accordance with the present disclosure can provide enhanced performance over prior art approaches. By suspending the tire pressure sensor axially between the sidewall of the tire and radially between the wheel rim and the tire driving surface, the tire pressure monitor can be less likely to be impacted by debris contained within the space between the wheel and tire. Thus, a sensor installed in accordance with this disclosure may not need as much armor or protection from such debris, making the sensor package lighter and thus decreasing rotating mass. While prior art approaches generally required the sensor itself to absorb all forces generated by impact of debris due to the sensor itself being mounted on the sidewall, a TPMC in accordance with the disclosure is better suited for absorbing impact through flexure of the legs, for example, and/or deflection of debris from the sensor.

It will also be appreciated that the TPMC disclose herein simplify installation and/or reduce costs such that more than one sensor can easily be installed in a tire to provide sensor redundancy and/or allow for sensing other parameters of the tire and/or wheel. This can further increase efficiency by reducing vehicle downtime.

Aspects of this disclosure are particularly well-suited to large diameter tires and/or low speed applications wherein the forces generated during use are relatively low. Examples of such applications are mining trucks, loaders and other large earth-moving equipment.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A wheel and tire assembly comprising:
   a tubular wheel having a central axis of rotation, a circumferential rim and first and second axially spaced apart circumferential rim flanges extending radially outwardly from the rim;
   a tire having a circumferential driving surface extending between opposing sidewall portions, the tire supported on the wheel between the first and second rim flanges; and
   a tire pressure monitor carrier interposed between the wheel and tire for supporting a tire pressure monitor, the carrier having a cradle portion extending between the sidewall portions of the tire, and first and second retaining members at opposite ends of the cradle portion for securing the carrier to the tire between the sidewalls prior to installation of the tire on the wheel and for locking the carrier in place between the tire and rim after installation of the tire on the wheel.

2. The wheel and tire assembly according to claim 1, wherein each retaining member has an axial end face for abutting an interior surface of a respective sidewall, and an axially extending lip interposed between the tire and the rim, such that the axial end faces of the first and second retaining members secure the carrier to the tire prior to installation of the tire on the wheel, and wherein the axially extending lips of the first and second retaining members are compressed between the tire and rim to thereby lock the carrier in place after assembly of the tire on the wheel.

3. The wheel and tire assembly according to claim 1, wherein the carrier includes at least one tire pressure monitor mount portion located between the first and second retaining members for supporting a tire pressure monitor.

4. The wheel and tire assembly according to claim 3, wherein the mount portion is spaced radially outwardly from the first and second retaining members.

5. The wheel and tire assembly according to claim 4, wherein the retaining members are separate components attached to the cradle portion.

6. The wheel and tire assembly according to claim 1, wherein the carrier further includes a pair of axially extending legs extending from opposite sides on the cradle portion, each leg having a retaining member at a distal end thereof.

7. The wheel and tire assembly according to claim 1, wherein the carrier has an axial dimension that is greater than the axial distance between the sidewalls of the tire prior to installation of the tire on the wheel, whereby the carrier, when interposed between the sidewalls of the wheel, urges the sidewalls apart from each other.

8. The wheel and tire assembly according to claim 1, wherein the carrier is made of a composite material.

9. The wheel and tire assembly according to claim 1, wherein at least a portion of the retaining members are metal.

10. The wheel and tire assembly according to claim 1, further comprising a tire pressure monitor supported by the carrier.

11. A tire pressure monitor carrier for supporting a monitor inside an associated wheel and tire assembly comprising:
    a support portion for supporting a tire pressure monitor, and first and second retaining members operative connected to the support portion for securing the carrier between sidewalls of an associated tire, wherein each retaining member includes a lip configured to be compressively engaged by between the associated tire and an associated wheel to which the associated tire is mounted, the lips of the retaining member being operative to secure the carrier in position inside the associate tire after the tire is mounted to the associated wheel.

12. The tire pressure monitor carrier according to claim 11, wherein the carrier has a longitudinal axis and each retaining member has an axial end face for abutting an interior surface of a respective sidewall of the associated tire, and each lip of the retaining members extends axially outwardly from the respective axial end faces, such that the axial end faces of the first and second retaining members secure the carrier to the associated tire prior to installation of the associated tire on the associated wheel, and wherein the axially extending lips of the first and second retaining members are configured to be compressed between the associated tire and the associate wheel to thereby lock the carrier in place after assembly of the associated tire on the associated wheel.

13. The tire pressure monitor carrier according to claim 11 wherein the carrier further includes a pair of axially extending legs extending from opposite sides of the cradle portion, each leg having a retaining member at a distal end thereof.

14. The tire pressure monitor carrier according to claim 13, wherein the legs are curved such that the cradle portion of the carrier is spaced apart from a rim of the associated wheel when the carrier is installed in an associated wheel and tire assembly.

15. The tire pressure monitor carrier according to claim 11, wherein the carrier is made of a composite material.

16. The tire pressure monitor carrier according to claim 11, wherein the retaining members are separate components attached to the cradle portion.

17. A wheel and tire assembly comprising:
a wheel;
a tire mounted to the wheel; and
the tire pressure monitor according to claim 11.

18. A method of mounting a tire pressure monitor to a wheel and tire assembly comprising:
positioning a tire pressure monitor carrier having a cradle portion and retaining members extending from opposing sides of the cradle portion between respective sidewalls of an unmounted tire;
temporarily securing the tire pressure monitor to the sidewalls of the tire by engaging the retaining members with the side walls of the tire;
mounting the tire on a wheel while the carrier is temporarily secured to the tire;
and fixing the tire pressure monitor between the tire and the wheel.

19. A method according to claim 18, wherein the fixing step includes compressing a portion of at least one retaining member between the tire and the wheel.

20. A method as set forth in claim 18, further comprising the step of locking the tire pressure monitor in place by pressurizing the tire.

21. A wheel and tire assembly mounted according to the method according to claim 18.

* * * * *